United States Patent
Paine et al.

[15] 3,665,751
[45] May 30, 1972

[54] LOW-CYCLE FATIGUE TESTING MACHINE

[72] Inventors: Thomas O. Paine, Administrator of the National Aeronautics and Space Administration with respect to an invention of; Christos Demogenes, 16050 Temecula Street, Pacific Palisades, Calif. 90272; Connie E. Richard, 228 Stepney Street, Apt. 2, Inglewood, Calif. 90302

[22] Filed: Aug. 4, 1970

[21] Appl. No.: 60,881

[52] U.S. Cl............................................73/15.6, 73/100
[51] Int. Cl.........................................G01n 3/20, G01n 3/32
[58] Field of Search......................................73/15.6, 91, 100

[56] References Cited

UNITED STATES PATENTS

| | | | |
|---|---|---|---|
| 1,409,842 | 3/1922 | Foster | 73/100 |
| 3,075,378 | 1/1963 | Bernard et al. | 73/15.6 |
| 3,534,597 | 10/1970 | Webb | 73/15.6 |
| 3,381,526 | 5/1968 | Rastogi et al. | 73/15.6 |
| 2,909,057 | 10/1959 | Ottestad et al. | 73/15.6 |
| 3,142,174 | 7/1964 | Baker | 73/100 |

*Primary Examiner*—Richard C. Queisser
*Assistant Examiner*—Herbert Goldstein
*Attorney*—John R. Manning and Howard J. Osborn

[57] ABSTRACT

A low-cycle, fatigue tester which simulates cyclic thermal loading by the application of cyclic mechanical stresses and deformations. The specimen is heated to the critical (most conducive to failure) temperature of the structure under consideration, and then deformed cyclically by the two interconnected, opposing, convex jaws of a mandrel driven reciprocally by an oscillating ram. The cyclic wrapping of the specimen around the opposing jaws of the mandrel mechanically induces alternating compression and tension stresses in the surface of the specimen which simulate the thermal stresses that would be caused by a temperature gradient through the depth of the structure under consideration. The stress level is controlled by the radius of the mandrel. The frequency of the oscillation is representative of the frequency of the thermal cycle affecting the structure under consideration.

8 Claims, 5 Drawing Figures

Patented May 30, 1972                                                                                     3,665,751

INVENTORS
CHRISTOS DEMOGENES
CONNIE E. RICHARD

BY Howard J. Osborn

ATTORNEY

LOW-CYCLE FATIGUE TESTING MACHINE

ORIGIN OF THE INVENTION

The invention described herein was made in the performance of work under a NASA contract and is subject to the provisions of Section 305 of the National Aeronautics Space Act of 1958, Public Law 85-568 (72 stat. 435, 42 U.S.C. 2457).

This invention relates to a low-cycle fatigue testing machine. The invention relates in particular to a low-cycle fatigue tester which simulates cyclic thermal loading by applying controlled cyclic mechanical stresses and deformations. The prior art provides a selection of bending stress, fatigue testing machines, some of which involve testing throughout a temperature range. However, there is no prior art device designed to simulate the thermal stresses produced by a temperature gradient across a structural member or to simulate changes in such thermal stresses due to cyclic heating of the member.

An extremely hostile environment will exist within the hydrogen-fueled propulsion system of a hypersonic cruise aircraft presenting a difficult and challenging structural design problem. The interior walls of the inlet ducts and engine will be required to contain gases at pressures up around 250 p.s.i. and at temperatures that may exceed 7,000° R. Because of their interior positions, these walls will be unable to dissipate the incident heat through radiation, thus requiring some form of active cooling such as regenerative cooling using the cryogenic hydrogen fuel. Heat-exchanging, interior wall, structural panels will be subject to a very large temperature gradient. The temperatures influencing this gradient range from the high temperatures caused by engine combustion to the low temperatures of the cryogenic coolant. Moreover, the structure will experience a cyclic variation of these temperature gradients as the engine performs its normal operational cycle. With these factors in mind, design and materials testing problems of hydrogen cooled structural panels for the interior engine walls of a hypersonic cruise aircraft can be better appreciated.

One problem to be faced is thermal loading caused by the temperature gradient across the structural member. When one surface of a rigidly held, heat-exchanging panel is heated more than another, thermal stresses develop. The material in the higher temperature surface attempts to expand or bend toward the heat source. Resistance to this bending produces compression forces in the higher temperature surface of the structural member and tension forces in the lower temperature surface of the structural member. For the expected applications, the thermally induced stresses will be sufficiently high to produce in plane plastic deformation of the material. Upon removal of the temperature gradient (after engine shutdown), the plastic deformation will cause reversed residual stresses in the structural member, i.e., tensile loads will be found in the surface formerly under compression and compression stresses will exist in the surface formerly under tension. Cumulative damage produced by repeated thermal cycles ultimately causes failure, commonly termed low-cycle thermal fatigue failure, of the heat-exchanging structural panel. Therefore, to test the design and materials of several heat-exchanging, structural panels it became necessary to develop a novel fatigue testing machine to test sections of the panels at or near the design temperature range while simulating the thermal stresses to be experienced due to large temperature gradients and large variation in such temperature gradients.

Accordingly, it is an object of the present invention to provide a low-cycle, fatigue testing machine which simulates thermal loads by means of mechanical stresses and deformations.

Another object of the present invention is to provide a low-cycle, fatigue tester which simulates cyclic thermal loads by applying cyclic mechanical stresses and deformations.

Another object of the present invention is to provide a method of applying controlled strain to the specimen in simulation of plastic thermal strain.

Another object of the present invention is to provide a fatigue testing machine for high temperature testing.

A further object of the present invention is to provide a low-cycle, fatigue testing machine which simulates cyclic thermal loads combined with mechanical loads by applying cyclic mechanical stresses and deformations.

A further object of the present invention is to provide a fatigue testing machine in which specimen failure is easily detected.

According to the present invention, the foregoing and other objects are attained by providing a specimen supported between two interconnected, opposing, convex jaws of a mandrel so that the specimen may be freely deformed in bending by movement of the mandrel. The jaws of the mandrel are shaped to give the desired mechanical stresses and deformations representative of thermal loading to the specimen whenever either jaw is moved to bend the specimen. An oscillating ram imparts reciprocal motion simultaneously to both jaws of the mandrel, each jaw, in turn, deforming the specimen in first one and then the other direction of reciprocal motion. In bending, the surface of the specimen conforms with the surface of the jaws at points of contact between the specimen and the jaws. The resultant deformation of the specimen simulates the desired thermal loading. Movement of the ram in causing the cyclic reversal of the direction of deformation of the specimen simulates the change in thermal loading caused by a change in the temperature gradient across the structural member. The specimen and mandrel assembly is contained within a heating chamber. Temperature within the heating chamber is maintained at a value which is deemed to be most critical in terms of failure of the structural member under consideration. Either surface of the test specimen can represent the high temperature surface or the low temperature surface of the structural member under consideration. Since the test specimen is a section of a regeneratively cooled panel having cooling cavities, specimen failure may be detected by pressurizing the cooling cavities and noting the loss of pressure when fatigue cracks occur.

A more complete appreciation of the invention and many of the attendant advantages thereof will be readily apparent as the same becomes better understood by reference to the following detailed description when considered in connection with the accompanying drawings wherein.

Figure 1:
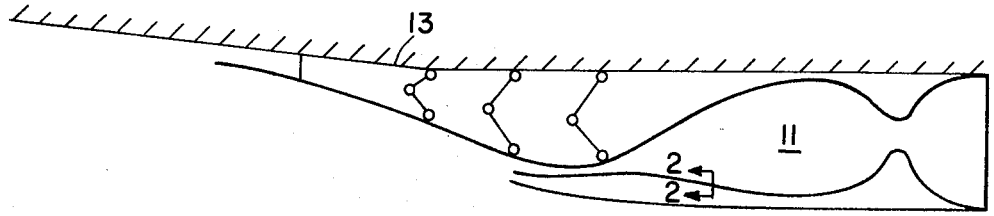
FIG. 1 is a schematic of a hydrogen-fueled propulsion system of hypersonic cruise aircraft.

Referring now more particularly to the drawings wherein like numerals identify like parts throughout the several views, and more particularly to FIG. 1, there is shown a ram jet 11 suspended beneath the wing 13 of the proposed hypersonic cruise aircraft.

Figure 2:
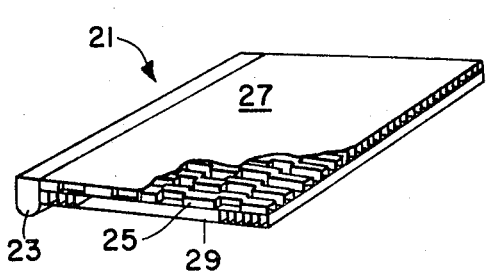
FIG. 2 is a perspective view partially cutaway of a regeneratively cooled structural panel used in the interior wall of the propulsion system of a hypersonic cruise aircraft.

The hydrogen-cooled structural panel 21 shown in FIG. 2 is a cutaway portion of the interior wall of ram jet 11 (shown in FIG. 1). A manifold 23 directs the cryogenic coolant such as hydrogen to the interior of panel 21 where it is circulated among the fins 25, thus cooling the panel. During the engine operation, cover plate 27, being nearer the source of the heat, will be subjected to much higher temperatures than the bottom plate 29 which is cooled more effectively by the cryogenic coolant.

Figure 3:
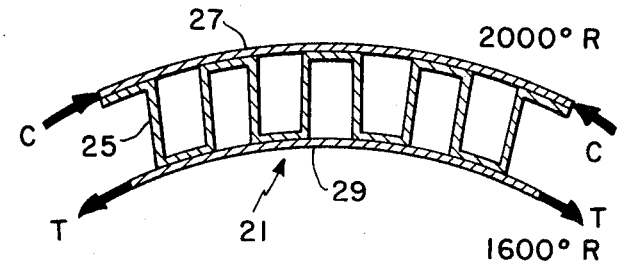
FIG. 3 is an end view of a structural panel subjected to thermal loading and strain caused by a temperature gradient across the panel.

FIG. 3 illustrates that one surface 27 of a structural member 21 is maintained at a higher temperature than another surface 29. Resistance to expansion caused by this higher temperature in the material of surface 27 creates thermally induced compression forces C. The relatively lower temperature of surface 29 creates the thermally induced tensile forces T. The resultant loading of structural member 21 is called thermal loading.

Figure 4:
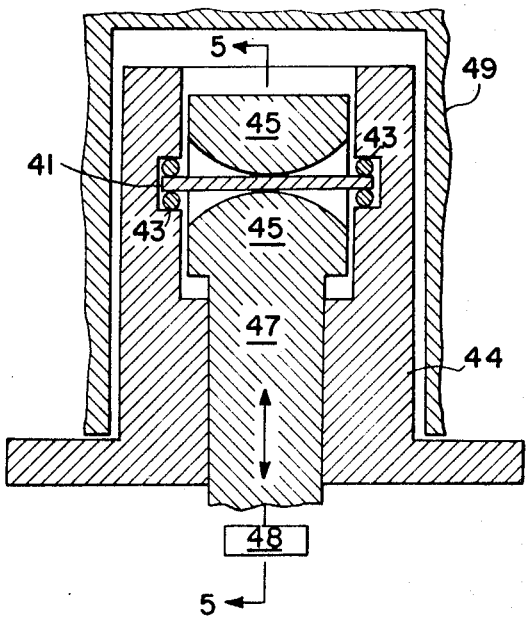
FIG. 4 is a front cross-sectional view of the novel low-cycle, fatigue testing machine partly in schematic.
Figure 5:
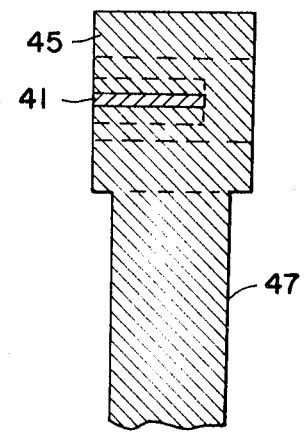
FIG. 5 is a side view in cross section of the mandrel used in the low-cycle, fatigue testing machine.

Referring now to FIG. 4, specimen 41 is supported by bearings 43 and support structure 44 between the jaws 45 of a mandrel 47. The opposing convex jaws 45 of mandrel 47 are interconnected and reciprocally moved by an oscillating ram 48. The specimen and mandrel assembly are surrounded by an electric furnace 49. FIG. 5 shows a side view of mandrel 47. Specimen 41 fits in the slot between the jaws.

OPERATION

The operation of the present invention is now believed to be apparent. The surfaces of the jaws 45 which contact the specimen 41 during tests are given a circular-arc shape depending upon the amount of thermal loading to be simulated. The radius of curvature of the jaws is selected to simulate the desired thermal loading. The amount of thermal loading to be simulated depends upon the expected temperature gradient across the structural panel and upon structural panel design and size. Specimen 41 is mounted between the jaws 45 of mandrel 47 with points of tangency between both jaws and the surfaces of the specimen. The specimen is supported by bearing mounts 43 to allow free bending. The oscillating ram 48 moves the mandrel reciprocally, bending specimen 41 in simulation of cyclic thermal loading. The amplitude of this reciprocal motion must suffice to cause the specimen to wrap around the mandrel with maximum specimen-to-mandrel contact. The frequency of this reciprocal motion is representative of the frequency of the cyclic heating expected to affect an actual structural panel.

Electrical furnace 49 maintains specimen 41 at a constant temperature during the test. This temperature is that which is most conducive to panel failure-usually the maximum temperature to be experienced, such as the inner engine wall temperature. Since both surfaces of specimen 41 are alternately bowed outward by the reciprocal motion of mandrel 47, either surface may represent the engine inner wall surface of the structural panel for testing purposes. If the temperature maintained by furnace 49 in the test section is that of the outer surface of the structural panel, either surface of specimen 41 can be considered the outer surface of the engine wall structural panel for test purposes since both surfaces of specimen 41 are alternately bowed inward by the reciprocal motion of mandrel 47. By varying the radius of curvature of the jaws 45, structural panel mechanical loads due to engine combustion pressure which are superimposed upon the thermal loads due to the heat of combustion can be simulated in combination with the thermal loads during specimen testing. Both the expected thermal and mechanical loads are theoretically calculated based upon the most rigorous forecast of engine parameters affecting structural integrity. Specimens representing sections of the regeneratively cooled structural panels are tested to failure and fatigue life in cycles is recorded. During the tests, the section may be sealed and pressurized so that failure of the specimen will be marked by the escaping of the contained pressure. It is thus seen that the present invention allows simulation of thermal stresses and strains by mechanical means.

Although the invention has been described and illustrated in detail in a specific embodiment thereof, it is to be understood that this description is by way of illustration only and is not to be taken as limiting on the applicant's invention. Obviously, there are many modifications and variations of the present invention possible in the light of the above teachings. Almost any material having the requisite heat-resistive properties may be used in construction of the testing device.

What is claimed as new and desired to be secured by Letters Patent of the United states is:

1. A fatigue testing device comprising:
    a heating chamber serving to maintain a temperature actually experienced by a structure to be tested and which is most conducive to fatigue failure of the structure;
    a specimen;
    means for mounting said specimen in said chamber so that said specimen, including its ends, may deform freely;
    mandrel means for deforming said specimen in a shape simulating cyclic thermal loading which normally occurs due to a cyclic change in temperature gradient across the structure to be tested;
    oscillating means for imparting reciprocal motion to said mandrel means.

2. The fatigue testing device of claim 1 wherein the mandrel means is comprised of two interconnected, opposing jaws convexly shaped to correspond to the desired thermal loading of the specimen, the surface of said specimen conforming with the surface of said jaws at points of contact between said specimen and said jaws, the said jaws serving to deform the specimen as the actual structure would deform if it were free to deform when subjected to thermal loading alone.

3. The fatigue testing device of claim 2 wherein the means for mounting said specimen includes bearings restraining ends of said specimen and permitting the entire specimen to deform freely in response to movement of said mandrel means.

4. A method of metal fatigue testing whereby the stresses associated with thermal loading are mechanically simulated comprising the steps of:
    providing a specimen;
    heating said specimen to maintain a constant specimen temperature;
    mounting said specimen so that said specimen, including its ends, may deform freely; and
    mechanically bending said specimen in a shape simulating thermal loading caused by a temperature gradient across the structure.

5. The method of claim 4 wherein the step of mechanically bending includes cyclically bending said specimen in two opposite directions, in simulation of repeated thermal loading in the plastic strain range, the frequency of said cyclic bending being representative of the frequency of cyclic heating of a specimen undergoing cyclic thermal loading.

6. The method of claim 4 wherein the constant specimen temperature is maintained at a value which is the most critical and the most conducive to fatigue failure of a structural member under consideration.

7. The method of claim 5 including the further step of sealing and pressurizing said specimen, whereby a loss of pressure in the specimen indicates failure of the specimen due to fatigue cracks and wherein the constant specimen temperature is maintained at a value which simulates the temperature most critical or most conducive to fatigue of a structural member under consideration.

8. A method of metal fatigue testing wherein the stresses associated with thermal loading caused by a temperature gradient across a structure are simulated comprising the steps of:
    providing a specimen;
    sealing and pressurizing said specimen;
    heating said specimen to a constant temperature;
    mechanically bending said specimen in a shape simulating thermal loading caused by a temperature gradient across the structure, whereby a loss of pressure in the specimen indicates failure of the specimen due to fatigue cracks.

* * * * *